(12) United States Patent
Davidson et al.

(10) Patent No.: US 8,856,254 B2
(45) Date of Patent: *Oct. 7, 2014

(54) PROVIDING A COLLABORATIVE STATUS MESSAGE IN AN INSTANT MESSAGING SYSTEM

(71) Applicant: International Business Machines Corporation, Armonk, NY (US)

(72) Inventors: Howard R. Davidson, Hudson, MA (US); Itzhack Goldberg, Hadera (IL); Boaz Mizrachi, Haifa (IL); Timothy P. Winkler, Skokie, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/873,915

(22) Filed: Apr. 30, 2013

(65) Prior Publication Data

US 2013/0238737 A1  Sep. 12, 2013

Related U.S. Application Data

(63) Continuation of application No. 13/413,756, filed on Mar. 7, 2012.

(51) Int. Cl.

| | |
|---|---|
| G06F 15/16 | (2006.01) |
| H04L 12/18 | (2006.01) |
| H04L 12/58 | (2006.01) |
| H04L 12/24 | (2006.01) |

(52) U.S. Cl.
CPC ............ *H04L 51/04* (2013.01); *H04L 12/1818* (2013.01); *H04L 12/581* (2013.01); *H04L 12/1822* (2013.01); *H04L 41/026* (2013.01); *H04L 51/046* (2013.01); *H04L 41/5093* (2013.01); *H04L 12/1813* (2013.01)
USPC .......... 709/206; 709/207; 709/204; 705/7.18; 705/7.19

(58) Field of Classification Search
CPC ............ H04L 12/1813; H04L 12/1818; H04L 12/1822; H04L 12/581; H04L 41/026; H04L 41/5093
USPC ........ 709/206, 204, 207; 715/753; 455/456.1, 455/414.1; 348/14.08; 705/7.18, 7.19
See application file for complete search history.

(56) References Cited

U.S. PATENT DOCUMENTS

| | | |
|---|---|---|
| 7,249,123 B2 | 7/2007 | Elder et al. |
| 7,752,273 B2 | 7/2010 | Ito et al. |

(Continued)

OTHER PUBLICATIONS

Office Action for U.S. Appl. No. 13/413,756 dated Nov. 5, 2103, pp. 1-11.

*Primary Examiner* — Le H Luu
(74) *Attorney, Agent, or Firm* — Robert A. Voigt, Jr.; Winstead, P.C.

(57) ABSTRACT

A method, system and computer program product for providing a collaborative status message in an instant messaging system. Instant Messaging ("IM") users that belong to a group are identified. A collaborative status message (e.g., "In Meeting with User 2 and User 3") is generated that specifies the IM users of the group (e.g., User 2 and User 3) that are participating in an event (e.g., meeting) with an IM user upon the event occurring. The collaborative status message is broadcasted to other IM users. In this manner, more detailed information can be provided to other IM users regarding the status of the IM user in question.

5 Claims, 5 Drawing Sheets

(56) References Cited

U.S. PATENT DOCUMENTS

| | | |
|---|---|---|
| 7,765,265 B1 | 7/2010 | Granito et al. |
| 2006/0242234 A1 | 10/2006 | Counts et al. |
| 2010/0057857 A1 | 3/2010 | Szeto |
| 2012/0084356 A1* | 4/2012 | Ferdi ............................ 709/204 |
| 2012/0165035 A1* | 6/2012 | Chen et al. ................. 455/456.1 |
| 2012/0231770 A1* | 9/2012 | Clarke et al. ................ 455/414.1 |
| 2012/0290950 A1* | 11/2012 | Rapaport et al. ............... 715/753 |
| 2013/0097237 A1* | 4/2013 | Kothari et al. ................ 709/204 |
| 2013/0106985 A1* | 5/2013 | Tandon et al. ............. 348/14.08 |
| 2013/0198296 A1* | 8/2013 | Roy et al. ...................... 709/206 |

\* cited by examiner

PROVIDING A COLLABORATIVE STATUS MESSAGE IN AN INSTANT MESSAGING SYSTEM

CROSS-REFERENCE TO RELATED APPLICATIONS

The present application is a continuation application of U.S. patent application Ser. No. 13/413,756, which was filed on Mar. 7, 2012, which is assigned to the assignee of the present invention. The present application claims priority benefits to U.S. patent application Ser. No. 13/413,756.

TECHNICAL FIELD

The present invention relates to instant messaging, and more particularly to providing a collaborative status message in an instant messaging system.

BACKGROUND

Instant messaging is a form of real-time communication between two or more computer users. Typically, the real-time communication is in the form of text that is typed into a computer by one user, and which is then received by another user during an Instant Messaging ("IM") session. The other user is then able to type a response during the same IM session, thus making instant messaging more seamless and instantaneous than e-mail and other types of computer-based communication.

Instant messaging has become very popular within the business community as it allows users to communicate more freely and openly, while also increasing productivity. However, instant messaging systems are limited in their functionality. By way of example, most instant messaging systems only allow the user to set an online status or away message so peers are notified when the user is available, busy, in a meeting, away from the computer, etc.

However, such status messages do not impart information directed to a collaborative status. For example, if two individuals have a status message of "in a meeting," such a status message does not impart information as to whether these individuals are in the same meeting.

By having a collaborative status message, more information can be provided to IM users, such as for example, which individuals are in a meeting.

BRIEF SUMMARY

In one embodiment of the present invention, a method for providing a collaborative status message in an instant messaging system comprises identifying instant messaging users that belong to a group. The method further comprises generating a collaborative status message specifying one or more instant messaging users of the group participating in an event with an instant messaging user upon the event occurring. In addition, the method comprises broadcasting, by a processor, the collaborative status message to other instant messaging users.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for providing a collaborative status message in an instant messaging system. In one embodiment of the present invention, Instant Messaging ("IM") users that belong to a group are identified. A collaborative status message (e.g., "In Meeting with User 2 and User 3") is generated that specifies the IM users of the group (e.g., User 2 and User 3) that are participating in an event (e.g., meeting) with an IM user upon the event occurring. The collaborative status message is broadcasted to other IM users. In this manner, more detailed information can be provided to other IM users regarding the status of the IM user in question.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
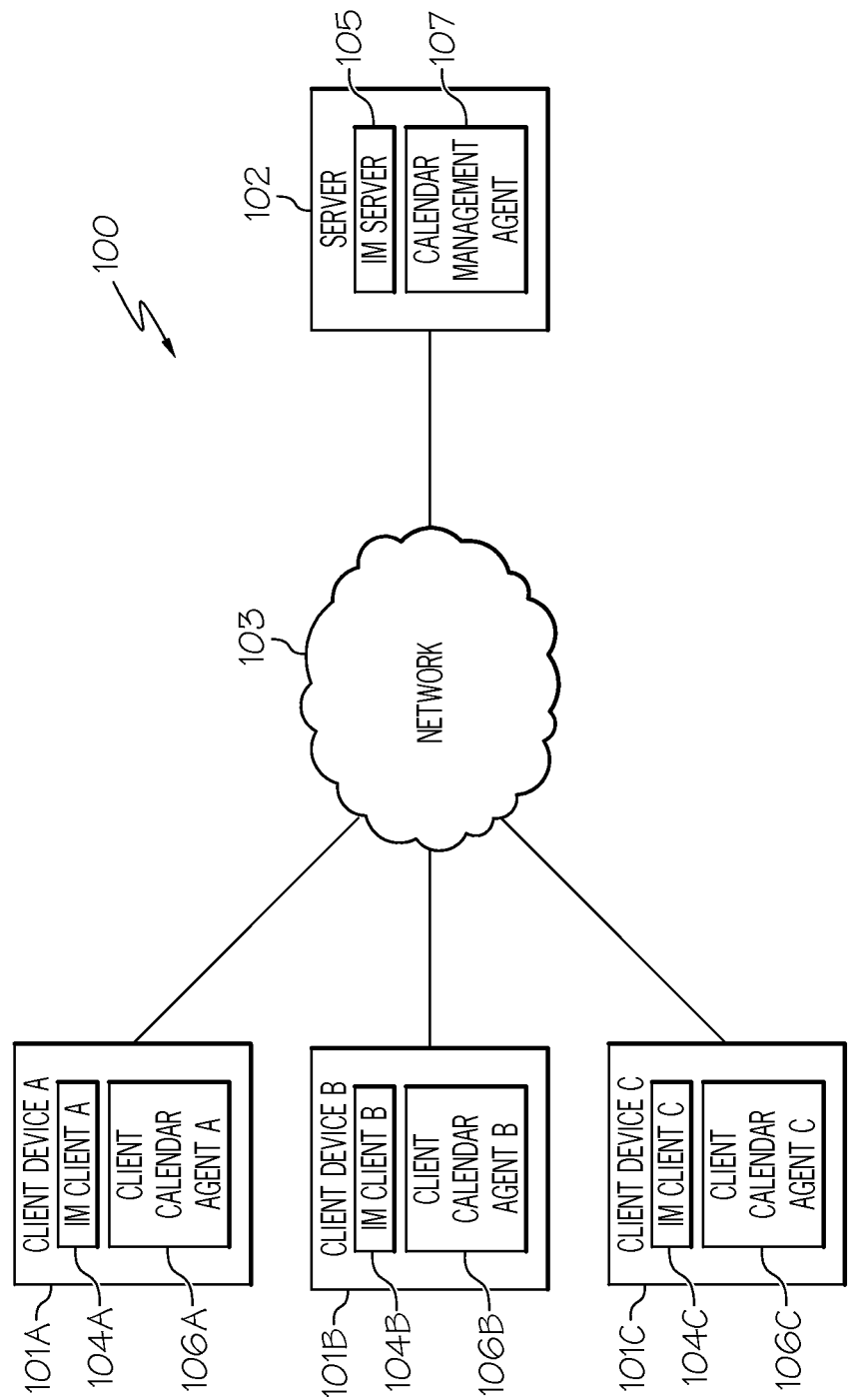
FIG. 1 illustrates an instant messaging system configured in accordance with an embodiment of the present invention.

Referring now to the Figures in detail, FIG. 1 illustrates an instant messaging system 100 for practicing the principles of the present invention in accordance with an embodiment of the present invention. Instant messaging system 100 includes client systems 101A-101C (identified as "Client A," "Client B," and "Client C," respectively, in FIG. 1) connected to a server 102 via a network 103. Clients 101A-101C may collectively or individually be referred to as clients 101 or client 101, respectively. Client 101 may be any type of computing device (e.g., portable computing unit, personal digital assistant (PDA), smartphone, laptop computer, mobile phone, navigation device, game console, desktop computer system, workstation, Internet appliance and the like) configured with the capability of connecting to network 103 and consequently communicating with other clients 101 and server 102. Each client 101 is configured to send and receive text-based messages in real-time during an instant messaging session as discussed further below. Any user of client 101 may be the creator or initiator of an instant message (message in instant messaging) and any user of client 101 may be a recipient of an instant message. A description of the hardware configuration of client 101 is provided below in connection with FIG. 2.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

In instant messaging system 100, clients 101A-101C include a software agent, referred to herein as an Instant Messaging (IM) client 104A-104C, respectively (identified as "IM Client A," "IM Client B," and "IM Client C," respectively, in FIG. 1). Instant messaging clients 104A-104C may collectively or individually be referred to as instant messaging clients 104 or instant messaging client 104, respectively. Furthermore, server 102 includes a software agent, referred to herein as the Instant Messaging (IM) server 105. IM client 104 provides the functionality to send and receive instant messages. As messages are received, IM client 104 presents the messages to the user in a dialog window (or IM window). Additionally, IM client 104 may present to the user a buddy or contact list, where the contact list includes a means for identifying those users participating in an event (e.g., meeting) via connected lines as discussed further herein. Furthermore, IM client 104 provides the functionality for client 101 to connect to the IM server 105 which provides the functionality of distributing the instant messages to the IM clients 104 associated with each of the sharing users.

Clients 101A-101C may further include a software agent, referred to herein as a client calendar agent 106A-106C, respectively (identified as "Client Calendar Agent A," "Client Calendar Agent B," and "Client Calendar Agent C," respectively, in FIG. 1). Client calendar agents 106A-106C may collectively or individually be referred to as client calendar agents 106 or client calendar agent 106, respectively. Furthermore, server 102 may include a software agent, referred to herein as the calendar management agent 107. Calendar management agent 107 interfaces with client calendar agent 106 to present meeting invitations to clients 101. Client calendar agent 106 is configured to display the received meeting invitation as well as display calendar schedule information on the client's 101 calendar user interface.

While FIG. 1 illustrates three clients 101A-101C and a single server 102, instant messaging system 100 may include any number of clients 101 and servers 102. The embodiments of instant messaging system 100 are not to be limited in scope to the depiction of FIG. 1.

Figure 2:
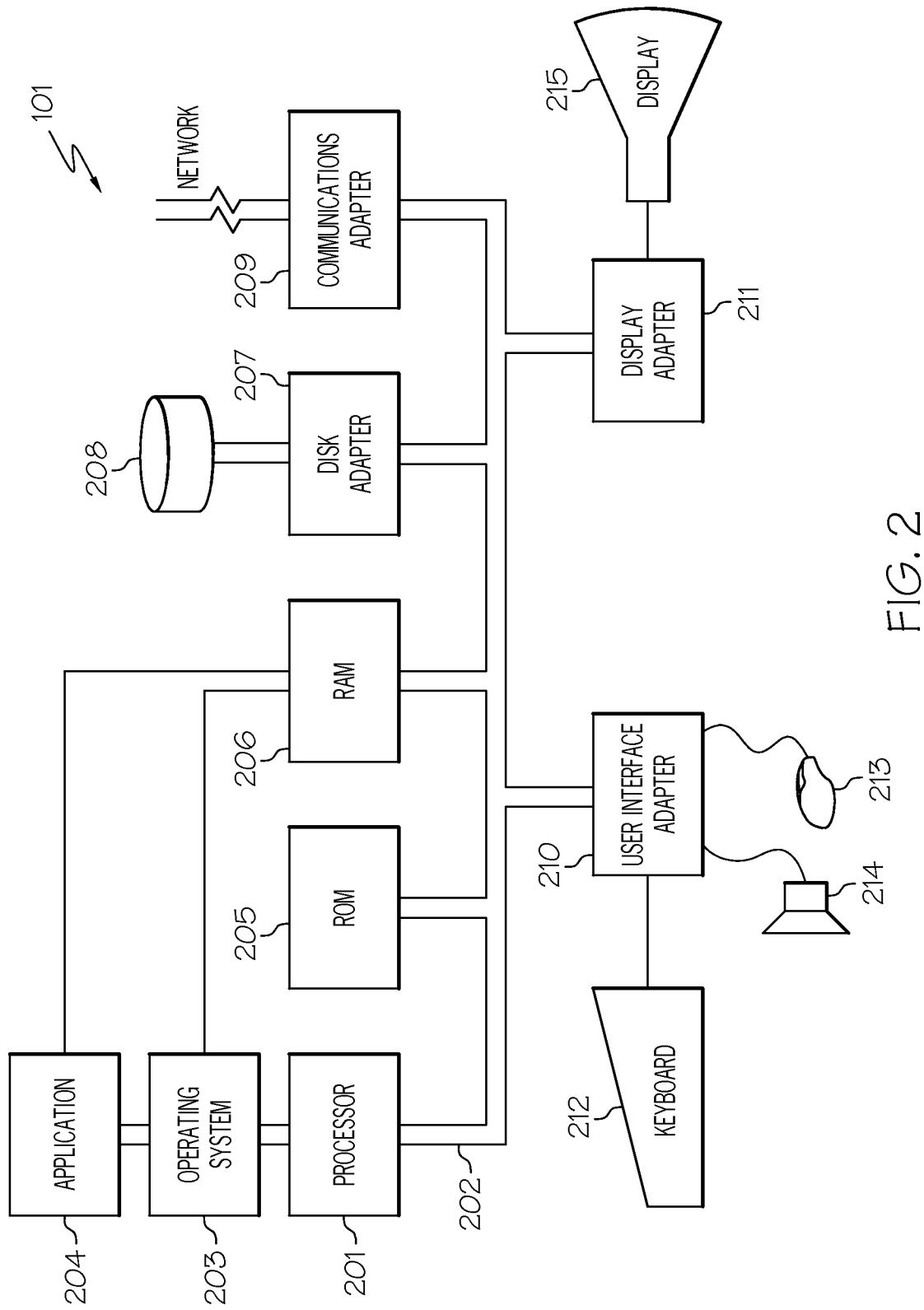
FIG. 2 illustrates a hardware configuration of a client system in accordance with an embodiment of the present invention.

Referring now to FIG. 2, FIG. 2 illustrates a hardware configuration of client 101 (FIG. 1) which is representative of a hardware environment for practicing the present invention. Referring to FIG. 2, client 101 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, IM client 104 (FIG. 1), calendar agent 106 (FIG. 1), a program for providing a collaborative status message as discussed further below in association with FIGS. 3-5.

Referring again to FIG. 2, read-only memory ("ROM") 205 is coupled to system bus 202 and includes a basic input/output system ("BIOS") that controls certain basic functions of client 101. Random access memory ("RAM") 206 and disk adapter 207 are also coupled to system bus 202. It should be noted that software components including operating system 203 and application 204 may be loaded into RAM 206, which may be client's 101 main memory for execution. Disk adapter 207 may be an integrated drive electronics ("IDE") adapter that communicates with a disk unit 208, e.g., disk drive. It is noted that the program for providing a collaborative status message, as discussed further below in association with FIGS. 3-5, may reside in disk unit 208 or in application 204.

Client 101 may further include a communications adapter 209 coupled to bus 202. Communications adapter 209 interconnects bus 202 with an outside network (network 103) thereby enabling client 101 to communicate with other clients 101 and server 102.

I/O devices may also be connected to client 101 via a user interface adapter 210 and a display adapter 211. Keyboard 212, mouse 213 and speaker 214 may all be interconnected to bus 202 through user interface adapter 210. A display monitor 215 may be connected to system bus 202 by display adapter 211. In this manner, a user is capable of inputting to client 101 through keyboard 212 or mouse 213 and receiving output from client 101 via display 215 or speaker 214.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, instant messaging systems are limited in their functionality. By way of example, most instant messaging systems only allow the user to set an online status or away message so peers are notified when the user is available, busy, in a meeting, away from the computer, etc. However, such status messages do not impart information directed to a collaborative status. For example, if two individuals have a status message of "in a meeting," such a status message does not impart information as to whether these individuals are in the same meeting. By having a collaborative status message, more information can be provided to IM users, such as for example, which individuals are in a meeting.

Figure 3:
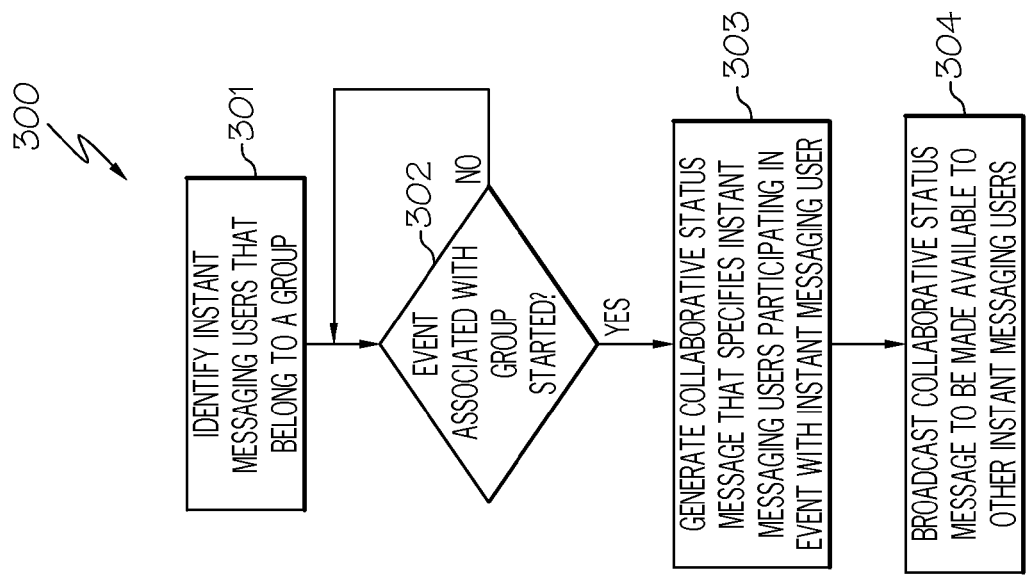
FIG. 3 is a flowchart of a method for providing a collaborative status message in an instant messaging system in accordance with an embodiment of the present invention.
Figure 4:
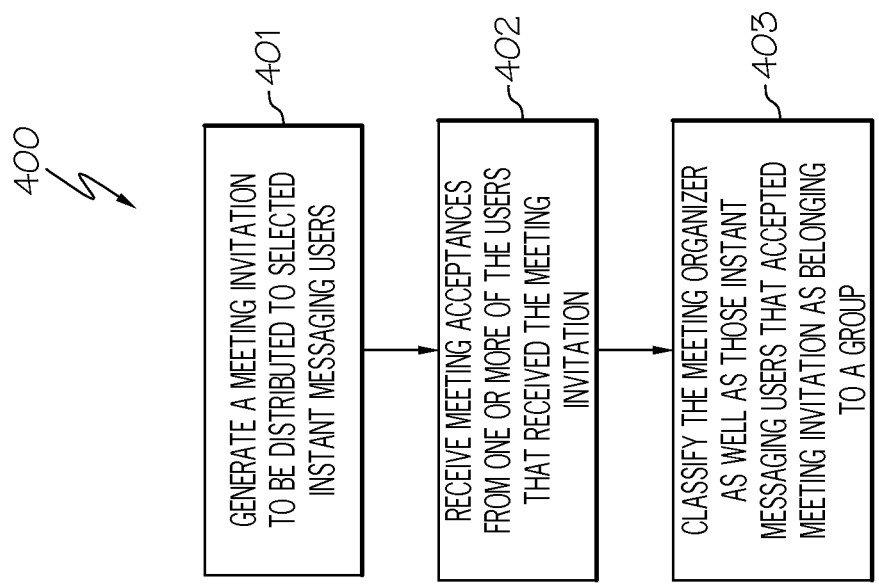
FIG. 4 is a flowchart of an exemplary method for identifying instant messaging users as belonging to a group in accordance with an embodiment of the present invention.
Figure 5:
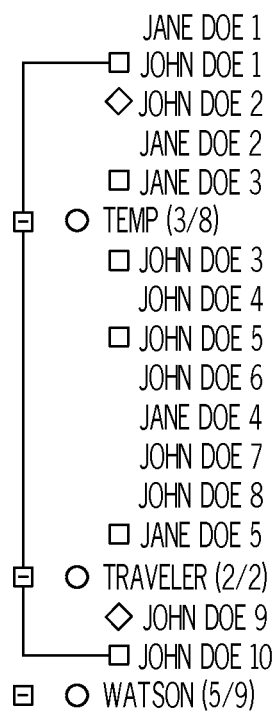
FIG. 5 illustrates identifying instant messaging users listed in a contact list that are participating in an event via connected lines between them in accordance with an embodiment of the present invention.

The principles of the present invention provide a means for providing a collaborative status message in an instant messaging system as discussed further below in connection with FIGS. 3-5. FIG. 3 is a flowchart of a method for providing a collaborative status message in an instant messaging system. FIG. 4 is a flowchart of an exemplary method for identifying instant messaging users as belonging to a group. FIG. 5 illustrates identifying instant messaging users listed in a contact list that are participating in an event (e.g., meeting) via connected lines between them.

FIG. 3 is a flowchart of a method 300 for providing a collaborative status message in instant messaging system 100 (FIG. 1) in accordance with an embodiment of the present invention.

Referring to FIG. 3, in conjunction with FIGS. 1-2, in step 301, IM client 104 identifies instant messaging users (e.g., users of clients 101) that belong to a group. In one embodiment, such a group may be predefined. For example, a user of client 101 may explicitly define the instant messaging users (e.g., users of clients 101B, 101C) belonging to a group. In another embodiment, such a group may be generated dynamically, such as at the time of collaboration (e.g., instant messaging users accepting a common meeting invitation, an activity each instant messaging user participates, etc.). For example, a group may be generated dynamically based on organization charts, job rolls, etc. In another example, a group may be generated dynamically based on instant messaging users who accepted a meeting invitation as discussed below in connection with FIG. 4.

FIG. 4 is a flowchart of an exemplary method 400 for identifying instant messaging users as belonging to a group based on those instant messaging users who accepted a meeting invitation in accordance with an embodiment of the present invention.

Referring to FIG. 4, in step 401, calendar agent 106 of client 101 (e.g., client 101A) generates a meeting invitation to be distributed to selected instant messaging users (e.g., instant messaging users of clients 101B, 101C). In one embodiment, calendar agent 106 may send the meeting invitation to a server, such as server 102, that includes calendar management agent 107, which distributes the meeting invitation to the invited users (e.g., users of clients 101B, 101C).

In step 402, calendar agent 106 of client 101 receives acceptances to the meeting invitation from one or more of the instant messaging users that received the meeting invitation.

In step 403, IM client 104 classifies the meeting organizer (i.e., the user of client 101 that issued the meeting invitation) and the instant messaging users that accepted the meeting invitation as belonging to a group.

In some implementations, method 400 may include other and/or additional steps that, for clarity, are not depicted. Further, in some implementations, method 400 may be executed in a different order presented and that the order presented in the discussion of FIG. 4 is illustrative. Additionally, in some implementations, certain steps in method 400 may be executed in a substantially simultaneous manner or may be omitted.

Returning to FIG. 3, in conjunction with FIGS. 1-2, as discussed above, instant messaging users (e.g., users of clients 101A, 101B, 101C) are identified as belonging to a group. In one embodiment, the collaborative status, as discussed further below, of the group may be in addition to the individual user statuses for each instant messaging user in the group.

In step 302, a determination is made by IM client 104 as to whether an event associated with a group has started. An event, as used herein, refers to the occurrence of an activity that involves the instant messaging users of a group. For example, a meeting may be classified as an event, as the activity of a meeting involves a group of individuals (e.g., a group of instant messaging users).

If the event associated with a group has not yet started, then, IM client 104 continues to determine whether an event associated with the group has stated in step 302.

If, however, an event associated with a group has started, then, in step 303, IM client 104 generates a collaborative status message that specifies the instant messaging users of the group (e.g., users of clients 101B, 101C) that are participating in the event (e.g., meeting) with the instant messaging user in question (e.g., user of client 101A) upon the event occurring. A collaborative status message, as used herein, refers to a message that provides the status of instant messaging users that are members of the group that involve an event (e.g., meeting). For example, suppose the instant messaging user of client 101A issued a meeting invitation (called "Big Meeting") to the instant messaging users (User 2, User 3) of clients 101B, 101C. Suppose further that the instant messaging users of clients 101B, 101C accepted the meeting invitation. Upon the occurrence of the meeting (i.e., upon the start of the meeting), a collaborative status message for the instant messaging user of client 101A may be generated that indicates that the instant messaging user of client 101A is "In Big Meeting with User 2 and User 3." In this manner, more detailed information can be provided to other IM users regarding the status of the instant messaging user of client 101A. In one embodiment, such collaboration information may be made available only to a subset of available IM users (e.g., only those IM users who are members of the group attending the meeting).

In step 304, IM client 104 broadcasts the collaborative status message to other IM users. For example, IM client 104 may send the collaborative status message to IM server 105, which distributes the collaborative status message to the IM clients 104 associated with each of the sharing users (i.e., those IM users that are to be able to view the collaborative status message). In one embodiment, IM client 104 that broadcasts the collaborative status message may inform IM server 105 which instant messaging users are to receive the collaborative status message. For example, the collaborative status message may be made available only to a subset of available IM users (e.g., only those IM users who are members of the group attending the meeting). In one embodiment, the collaborative status message may be in addition to the individual user statuses for each IM user in the group. In one embodiment, the information in the collaborative status message (e.g., "In Big Meeting with User 2 and User 3") may be displayed on the user interface of the IM users that received the collaborative status message, such as by identifying IM users listed in a contact list that are participating in an event (e.g., meeting) via connected lines between them as illustrated in FIG. 5.

FIG. 5 illustrates identifying instant messaging users listed in a contact list that are participating in an event (e.g., meeting) via connected lines between them in accordance with an embodiment of the present invention. Referring to FIG. 5, the individuals identified as "John Doe 1" and "John Doe 10" are connected by a line thereby indicating that such IM users are participating in an event (e.g., meeting).

In some implementations, method 400 may include other and/or additional steps that, for clarity, are not depicted. Further, in some implementations, method 400 may be executed in a different order presented and that the order presented in the discussion of FIG. 4 is illustrative. Additionally, in some implementations, certain steps in method 400 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for providing a collaborative status message in an instant messaging system, the method comprising:
identifying instant messaging users that belong to a group;
generating a collaborative status message specifying one or more instant messaging users of said group participating in an event with an instant messaging user upon said event occurring;
broadcasting, by a processor, said collaborative status message to other instant messaging users;
generating a meeting invitation to be distributed to one or more instant messaging users;
receiving acceptances to said meeting invitation from one or more of said one or more instant messaging users; and
classifying a meeting organizer and said one or more of said one or more instant messaging users that accepted said meeting invitation as belonging to said group.

2. The method as recited in claim 1, wherein said collaborative status message is broadcasted to a subset of available instant messaging users.

3. The method as recited in claim 2, wherein said subset of available instant messaging users are said instant messaging users of said group.

4. The method as recited in claim 1, wherein said one or more instant messaging users of said group participating in said event are identified as participating in said event via connected lines between said one or more instant messaging users listed in a contact list that is displayed on a user interface of said other instant messaging users.

5. The method as recited in claim 1, wherein said event comprises a meeting.

* * * * *